United States Patent [19]

Bell et al.

[11] Patent Number: 4,541,731
[45] Date of Patent: Sep. 17, 1985

[54] TEMPERATURE SENSITIVE TRANSDUCER WITH A RESONANT BIMETAL DISK

[75] Inventors: Lon E. Bell; William P. Gruber, both of Altadena, Calif.

[73] Assignee: Technar, Incorporated, Altadena, Calif.

[21] Appl. No.: 487,067

[22] Filed: Apr. 21, 1983

[51] Int. Cl.$^4$ ............................................. G01K 11/26
[52] U.S. Cl. ..................................... 374/117; 374/205; 116/221
[58] Field of Search ............... 374/117, 118, 119, 205; 73/DIG. 1, 778; 116/217, 221; 340/594; 331/66

[56] References Cited

U.S. PATENT DOCUMENTS

| | | | |
|---|---|---|---|
| 2,447,816 | 8/1948 | Rieber | 331/66 |
| 3,047,818 | 7/1962 | Regis | 331/66 |
| 3,318,152 | 5/1967 | Thompson et al. | 374/117 |
| 3,479,536 | 10/1969 | Norris | 73/DIG. 1 |

FOREIGN PATENT DOCUMENTS 0052535 3/1983 Japan .................................. 374/117

Primary Examiner—Charles Frankfort
Assistant Examiner—Patrick R. Scanlon
Attorney, Agent, or Firm—Christie, Parker & Hale

[57] ABSTRACT

A temperature sensing transducer has a mechanically vibrating member whose rigidity varies with temperature, changing the resonant frequency. An output signal is generated having a frequency controlled by the vibrating member. The rigidity is caused to vary with temperature by making the vibrating member from a material whose modulus of elasticity is sensitive to temperature changes in the desired measurement range. Also by making the vibrating member of a bimetal shaped as a frusto-conical disk, the rigidity of the disk changes with temperature due to internal strains.

6 Claims, 9 Drawing Figures

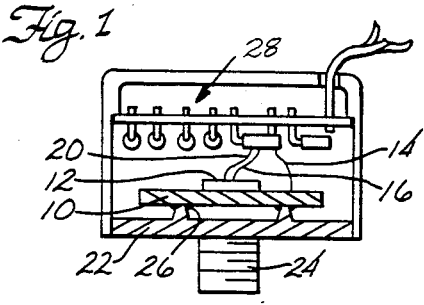
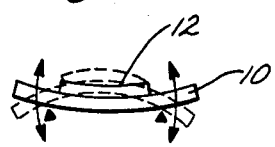
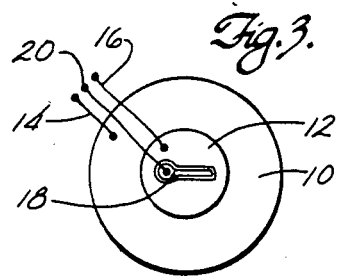
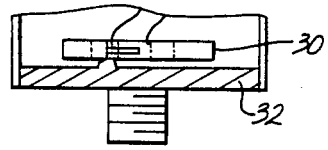
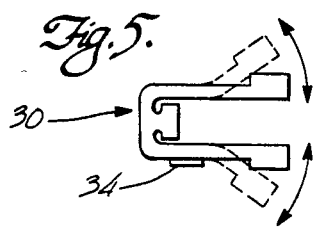
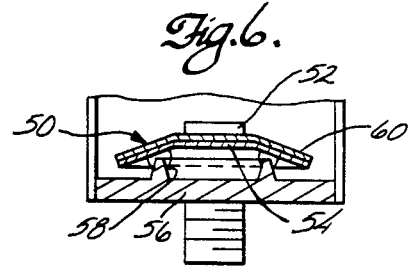
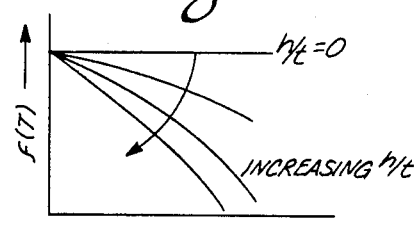
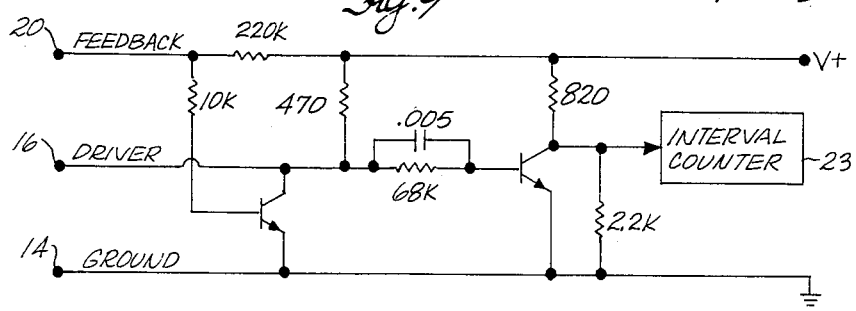

TEMPERATURE SENSITIVE TRANSDUCER WITH A RESONANT BIMETAL DISK

FIELD OF THE INVENTION

This invention relates to a temperature sensing transducer and, more particularly, to a transducer that provides a digital output that is a direct measure of temperature.

BACKGROUND OF THE INVENTION

Transducers utilizing a mechanically vibrating resonating element in the form of a reed or a disk are known. See U.S. Pat. No. 3,318,152. The resonant frequency of the vibrating element is varied in response to changes in the mechanical condition being measured. For example, by placing the vibrating element under greater or lesser tension in response to the condition being measured, the resonant frequency is changed. In this way a change in the physical quantity can be directly converted to a change in frequency. A digital output is generated by counting the cycles per unit of time of the vibrating element.

SUMMARY OF THE INVENTION

The present invention is directed to an improvement in a mechanically vibrating type of transducer which is particularly suited to measurement of temperature. A vibrating element in the form of a bar or disk is caused to vibrate in a free resonant mode by a piezoelectric element bonded to the vibrating element. The bar or disk is allowed to vibrate by supporting it at its free nodal points, so that it can resonate in a substantially free or unrestrained state. The resonant frequency of the vibrating element is made sensitive to small changes in temperture by designing the vibrating element so that its rigidity changes substantially with changes in temperature to change its natural frequency.

This is accomplished by using a material whose modulus of elasticity changes greatly with temperature, such as is characteristic of metal alloys having a low melting point. As the modulus of elasticity changes with temperature, the resonant frequency of the vibrating element changes with temperature. The geometric rigidity of the vibrating element can also be made to change with temperature by making the vibrating element out of a bimetal whose rigidity is a function of shape. The necessary change in shape is produced by temperature change which causes the bimetal to curl or flatten.

DESCRIPTION OF THE DRAWINGS

For a better understanding of the invention, reference should be made to the accompanying drawings, wherein:

FIG. 1 is a sectional view of one embodiment of a temperature sensitive transducer;

FIG. 2 is a cross-sectional view of the vibrating element of FIG. 1;

FIG. 3 is a top view of the vibrating element of FIG. 1;

FIG. 4 is a cross-sectional view of an alternative embodiment of the transducer of FIG. 1;

FIG. 5 is a top view of the vibrating member of FIG. 4;

FIG. 6 is a cross-sectional view of a further embodiment of the present invention;

FIG. 7 is a cross-sectional view;

FIG. 8 is a graphical plot showing the characteristic of the vibrating element of FIG. 7; and FIG. 9 is a schematic circuit diagram of a feedback oscillator.

DETAILED DESCRIPTION

As pointed out above, the present invention is directed to a temperature transducer which operates by changing the rigidity of a simple geometry by either a shape change or a change of material properties or a combination of the two effects. The resonant frequency of any mechanical system with negligible losses can be represented by the equation:

$$f = \sqrt{K/M} \tag{1}$$

where K is the rigidity constant and M is the effective mass of the vibrating system. By making K a function of temperature while the mass M remains constant, the resonant frequency of the system can be made temperature dependent. For a vibrating member in which all the strain energy is from bending, the rigidity can be written as:

$$K = E \times I \tag{2}$$

where E is the material's modulus of elasticity and I depends on the geometry of the device and the mode shape of its oscillation. By making either E or I or both change substantially with temperature, the frequency of the vibrating member can be made measurably temperature dependent.

Materials which exhibit a modulus of elasticity or Young's modulus that is sensitive to temperature include low melting alloys such as tin alloys hardened with copper and antimony or magnesium-lithium alloys. Obviously, at the melting point the modulus of elasticity goes to zero but the modulus exhibits rather substantial changes as the temperature approaches the melting point. This is in contrast to high melting point materials whose modulus of elasticity varies only slightly at normal temperatures, far below their melting points.

Referring to the drawings in detail, FIGS. 1–3 show one embodiment of a temperature sensitive transducer in which the vibrating element is in the form of a flat metal disk 10. The disk 10 can be caused to vibrate in a bending mode, as shown in FIG. 2, by means of a piezoelectric layer 12 applied to the central region of one side of the disk 10. The metal disk 10 forms one electrode of the piezoelectric layer 12 while a metal coating is applied to the other surface of the piezoelectric layer 12 to form the other electrode. Electrical leads 14 and 16 provide external connections to the electrodes of the piezoelectric layer. As shown by the feedback oscillator circuit of FIG. 9, an alternating voltage is applied across the leads 14 and 16. The piezoelectric layer, in response to this voltage causes the disk 10 to bend alternately, as indicated by the solid and broken lines of FIG. 2. A positive feedback signal is derived by providing a separate feedback electrode 18 on the surface of the piezoelectric layer 12 to which is connected an electrical lead 20. This feedback signal is amplified and used as the alternating voltage to drive the metal disk in a mechanical oscillation. The piezoelectric layer can thus be connected as a feedback oscillator which stabilizes at the resonant frequency of the mechanically vibrating disk. The driver signal, after being "squared"

to form pulses, is applied to an interval counter 23 which counts the number of pulses in a predetermined time interval.

Referring to FIG. 1, the temperature transducer is preferably constructed with a heat conductive base 22 which may be anchored to a heat source by a suitable mounting stud 24, for example. The base 22 is provided with a mounting ridge 26 which is circular and of a diameter to engage the disk 10 at the circular free nodal line about which the radial bending mode of vibration of the disk takes place. The ridge 26 makes good thermal contact with the disk 10 so that the temperature of the disk varies with the temperature of the heat source to which the base 22 is secured. An elastomeric adhesive is preferably employed to anchor the disk to the ridge 26 while allowing the disk to freely vibrate in its bending mode.

The feedback oscillator circuit FIG. 9 can be mounted on a printed circuit board, the circuit assembly being indicated generally at 28. The oscillator circuit is connected to the piezoelectric layer by the leads 14, 16 and 20. By counting the number of pulses generated by the oscillator per unit of time, the frequency of the vibrating member, which is a function of temperature, provides a digital indication which can be used as a direct measure of temperature. By making the disk 10 of a low melting point alloy, the rate of change of frequency as a function of temperature can be made quite large. Since the rigidity of the metal decreases with an increase in temperature, the relationship between frequency and temperature follows an inverse or negative slope relationship. For example, using a ⅜″ diameter disk 0.018″ in thickness made of an alloy consisting of 92 percent tin, 7 percent antimony and 1 percent copper, it was found that the resonant frequency varied substantially linearly between approximately 11.5 Khz at 25° C. down to approximately 10 Khz at 125° C.

The vibrating member 10 need not be in the form of a disk but may, for example, be in the form of a resonant bar. The bar may be folded in the form of a tuning fork. Such an arrangement is shown in FIGS. 4 and 5 in which the vibrating element, indicated generally at 30, is in the form of a tuning fork with the fork supported at the nodal point to a base member 32. A piezoelectric element 34 in the form of a layer applied to at least one of the operating arms of the vibrating bar 30 operates in the same manner as the piezoelectric element 12 described above to sustain oscillation at the resonant frequency of the bar. By making the bar of a low melting point alloy, the rigidity of the bar and hence the resonant frequency of the bar exhibits a substantial change with temperature.

The rigidity and hence the resonant frequency of the vibrating element can be made temperature dependent, not only by selecting materials which have a modulus of elasticity or Young's modulus that is highly temperature sensitive, but the rigidity can also be controlled with temperature by making the vibrating device of a bimetal whose internal stresses change with temperature because the tendency of the bimetal to bend with temperature is resisted by the geometry of the vibrating element.

For example, consider a bimetal disk in which the margin of the disk is formed into a substantially truncated conical shape, as shown in FIG. 7. If the lower expansion side is the convex side of this slightly dish-shaped disk, as the disk is heated, internal stresses tend to flatten the disk. This results in a change in the resonant frequency of the disk. FIG. 8 shows a group of curves relating the resonant frequency to temperature as a function of the ratio h/t. The thickness t of the bimetal and the height h are as measured at the temperature at which the bimetal is cold formed from a flat disk into the dish-shaped disk of FIG. 7. It will be seen that if the ratio is zero, corresponding to a flat bimetal disk, temperature changes have no effect on the resonant frequency of the disk. However, if the disk is formed with the margins formed into a truncated cone, as shown in FIG. 7, the resonant frequency becomes highly temperature sensitive. A very shallow cone is most effective. For example, a cone angle of approximately 170° shows good temperature sensitivity. The negative slope of the curves in FIG. 8 suggest that the temperature effect of the bimetal disk can be reinforced by the modulus change effect produced by low melting point alloys.

FIG. 6 shows the use of a bimetal disk in a temperature sensing transducer. A bimetal disk 50 has a piezoelectric layer 52 positoned on the flat central portion 54 of the disk. The disk is supported on a thermally conductive base 56 having a circular ridge 58 in contact with the conical rim 60 of the disk 50. Contact is at the circular nodal line of the vibrating disk. Again the disk is secured to the base by an elastomeric adhesive to maintain the bimetal disk in good thermal contact with the base 56. Any change in temperature of the base changes the resonant frequency of the disk and hence changes the frequency of the oscillator output voltage.

What is claimed is:

1. A temperature sensitive transducer comprising:
   a vibrating member comprising a bimetal disk having a resonant mode of vibration, the vibrating bimetal disk having a stiffness that changes over a wide range with small changes in temperature, electrical drive means for sustaining vibration of said bimetal disk in its resonant mode, and means for generating a periodic output signal tuned to the frequency of the vibrating bimetal disk.

2. Apparatus of claim 1 wherein the bimetal disk is internally stressed at the temperature at which it is substantially flat.

3. Apparatus of claim 1 wherein the bimetal disk is formed with a flat central region and a frusto-conical outer region, the bimetal disk having an outer convex layer and an inner concave layer.

4. Apparatus of claim 3 wherein said electrical drive means includes a piezoelectric element secured to the flat central region.

5. Apparatus of claim 3 wherein the outer convex layer of the bimetal disk has a lower co-efficient of expansion than the inner concave layer of the disk.

6. A temperature sensing apparatus comprising:
   a thermally conductive base, a bimetallic frusto-conical shaped vibrating disk supported from and in thermally conductive contact with the base at a free nodal point, the vibrating disk having a stiffness that changes widely with small changes in temperature, means for vibrating the disk in a resonant frequency mode, and means for generating a digital output indicative of the vibrating frequency of said disk.

* * * * *